US006494049B1

(12) United States Patent
Jones et al.

(10) Patent No.: US 6,494,049 B1
(45) Date of Patent: *Dec. 17, 2002

(54) CONTROL SYSTEM FOR CRYOGENIC PROCESSOR FOR LIQUID FEED PREPARATION OF FREE-FLOWING FROZEN PRODUCT

(75) Inventors: Stan Jones, Vienna, IL (US); Milford D. Jones, Grand Chain, IL (US); Curt D. Jones, Paducah, KY (US)

(73) Assignee: Dippin' Dots, Inc., Paducah, KY (US)

( * ) Notice: Subject to any disclaimer, the term of this patent is extended or adjusted under 35 U.S.C. 154(b) by 22 days.

This patent is subject to a terminal disclaimer.

(21) Appl. No.: 09/754,707

(22) Filed: Jan. 4, 2001

Related U.S. Application Data

(63) Continuation of application No. 09/617,724, filed on Jul. 17, 2000, now Pat. No. 6,209,329, which is a continuation-in-part of application No. 09/451,046, filed on Nov. 30, 1999, now Pat. No. 6,223,542, which is a continuation of application No. 09/066,140, filed on Apr. 24, 1998, now Pat. No. 6,000,229.
(60) Provisional application No. 60/232,564, filed on Sep. 14, 2000.

(51) Int. Cl.[7] .............................. F25C 1/00; F25D 17/02
(52) U.S. Cl. ................................. 62/74; 62/64; 62/377
(58) Field of Search ............................. 62/74, 64, 377, 62/373, 375, 376, 63

(56) References Cited

U.S. PATENT DOCUMENTS

| 4,009,740 A | 3/1977 | Michielli | 141/172 |
| 4,445,627 A | * | 5/1984 | Horak | 222/54 |
| 4,509,339 A | 4/1985 | Mehlan et al. | 62/450 |
| 4,655,047 A | * | 4/1987 | Temple et al. | 62/64 |
| 4,730,750 A | 3/1988 | Ficken | 221/124 |
| 4,741,178 A | 5/1988 | Fujiu et al. | 62/525 |
| 4,748,817 A | * | 6/1988 | Oura et al. | 62/74 |
| 4,831,841 A | 5/1989 | Falk | 62/381 |
| 4,920,764 A | 5/1990 | Martin | 62/259 |
| 5,027,698 A | 7/1991 | Chirnomas | 99/450 |
| 5,121,854 A | 6/1992 | Trouteaud et al. | 221/15 |

(List continued on next page.)

Primary Examiner—William C. Doerrler
(74) Attorney, Agent, or Firm—Thomas, Kayden, Horstemeyer & Risley (57) ABSTRACT

A cryogenic processor is provided for liquid feed preparation of a free-flowing frozen product comprising. In accordance with one aspect of the invention, the cryogenic processor includes a freezing chamber having a substantially conical shape, at least one feed tray overlying the freezing chamber arranged and adapted to receive liquid composition from a delivery source, the tray having a plurality of orifices for the discharge of uniformly sized droplets of the composition from the feed tray, whereby the droplets are delivered by gravity into the freezing chamber there-below. The cryogenic processor also includes at least one sensor associated with the feed tray for determining a depth of liquid composition in the feed tray, at least one valve associated with a liquid composition delivery line, the valve being configured to control the rate at which liquid composition is delivered from the delivery source to the feed tray, and a controller responsive to the at least one sensor for controlling a position of the valve, and therefore the rate at which liquid composition is delivered from the delivery source to the feed tray.

24 Claims, 5 Drawing Sheets

Microfiche Appendix Included
(2 Microfiche, 166 Pages)

U.S. PATENT DOCUMENTS

| | | | |
|---|---|---|---|
| 5,126,156 A | * 6/1992 | Jones | 426/418 |
| 5,224,415 A | 7/1993 | McFadden et al. | 99/357 |
| 5,281,429 A | 1/1994 | Zevlakis | 426/389 |
| 5,305,615 A | 4/1994 | McFadden et al. | 62/378 |
| 5,319,939 A | 6/1994 | McFadden et al. | 62/63 |
| 5,400,614 A | 3/1995 | Feola | 62/233 |
| 5,405,054 A | 4/1995 | Thomas | 222/95 |
| 5,417,081 A | 5/1995 | Rudick et al. | 62/440 |
| 5,421,484 A | 6/1995 | Beach | 222/95 |
| 5,463,878 A | 11/1995 | Parekh et al. | 62/394 |
| 5,557,944 A | 9/1996 | Hirano et al. | 62/469 |
| 5,664,422 A | 9/1997 | Jones | 62/64 |
| 5,704,216 A | 1/1998 | Hirano et al. | 62/114 |
| 5,718,119 A | 2/1998 | Wakita et al. | 62/85 |
| 5,772,072 A | 6/1998 | Prescott et al. | 221/121 |
| 5,842,349 A | 12/1998 | Wakita et al. | 62/85 |
| 6,000,229 A | * 12/1999 | Jones et al. | 62/74 |
| 6,209,329 B1 | * 4/2001 | Jones et al. | 62/74 |
| 6,327,869 B1 | * 12/2001 | Shapiro et al. | 62/347 |
| 6,354,091 B1 | * 3/2002 | Hemmes | 62/64 |

* cited by examiner

CONTROL SYSTEM FOR CRYOGENIC PROCESSOR FOR LIQUID FEED PREPARATION OF FREE-FLOWING FROZEN PRODUCT

CROSS-REFERENCE TO RELATED APPLICATIONS

This application is a continuation of U.S. patent application Ser. No. 09/617,724, filed Jul. 17, 2000, now U.S. Pat. No. 6,209,329, which is a continuation-in-part of U.S. patent application Ser. No. 09/451,046, filed Nov. 30, 1999, now U.S. Pat. No. 6,223,542, which is a continuation of U.S. patent application Ser. No. 09/066,140 (now U.S. Pat. No. 6,000,229), filed on Apr. 24, 1998, both entitled "Cryogenic Processor for Liquid Feed Preparation of a Free-Flowing Frozen Product and Method for Freezing Liquid Composition." Each of these prior applications are hereby incorporated by reference in their entireties. This application also claims the benefit of U.S. provisional application serial No. 60/232,564, filed Sep. 14, 2000.

MICROFICHE APPENDIX

This specification includes a microfiche appendix in compliance with 37 C.F.R. §1.96(c) consisting of two (2) slides and 166 frames.

1. Field of the Invention

The present invention relates generally to a frozen product preparation apparatus and, more particularly, to a cryogenic processor for liquid feed preparation of a free-flowing frozen product.

2. Description of the Prior Art

Sales of ice cream and frozen yogurt products have risen dramatically in recent years, and applicants herein have captured a portion of this product market through the development of a unique novelty ice cream, frozen yogurt and ice product in the form of beads. This product, marketed under the trademarks "Dippin' Dots®" and "Ice Cream of the Future®", has become very popular in specialty stores, at fairs and theme parks, and through vending machines.

Applicants have proprietary rights in the method of preparing and storing the product pursuant to U.S. Pat. No. 5,126,156, issued Jun. 30, 1992, herein incorporated by reference, as well as rights associated with improvements pursuant to U.S. Pat. No. 5,664,422, issued Sep. 9, 1997, and U.S. Pat. No. 6,000,229, issued Dec. 14, 1999, herein incorporated by reference. As is generally described therein, the patented method involves delivering flavored liquid dairy and other alimentary compositions to a feed tray and then dripping the composition into a freezing chamber. The feed tray comprises a plurality of orifices through which liquid composition passes to fall into the freezing chamber, either in the form of droplets or liquid streams, which streams break into droplets before freezing. Each orifice may also have a corresponding feed dropper, which is downwardly disposed in relation to the tray such that the liquid composition passes from the tray through an orifice and then through an associated feed dropper where a droplet or liquid stream is formed. The orifices or combination of orifices and feed droppers will hereinafter be referred to collectively as feed assemblies.

The falling droplets of liquid composition freeze rapidly (i.e., flash freeze) in the freezing chamber due to the presence of both gaseous and liquid refrigerant in the area between the orifices and the bottom of the freezing chamber, thereby forming solid beads of flavored ice cream, yogurt or other alimentary products, such as flavored ice. More specifically, as droplets of liquid free fall through a gaseous region of the freezing chamber, and before the droplets contact the liquid refrigerant, the outer spheres of the droplets form a thin frozen shell. This thin frozen shell serves to protect the spherical shape of the droplets as they impact the surface of the liquid refrigerant. The remainder of the droplets freeze completely as they pass through the liquid refrigerant, and before reaching the bottom of the freezing chamber. The frozen beads are removed from the freezing chamber and packed for distribution and later consumption.

It should be appreciated that the cryogenic processor used for preparing the above-described beaded ice-cream is a relatively sophisticated apparatus that should be tightly controlled for proper operation. For example, the liquid refrigerant preferably used is liquid nitrogen, which has an extremely high evaporation rate. It is typically desired to maintain approximately 19–21 inches of separation between the surface of the liquid nitrogen and the feed tray. If this separation distance is too small, then the liquid droplets may not have sufficient time during their free-fall from the feed tray to form the desired spherical shape. If the separation distance is too large then the impact of the droplets with the surface of the liquid nitrogen may become undesirably large. Accordingly, the introduction of liquid nitrogen into the freezing chamber should be closely controlled.

In addition, the rate at which liquid composition passes through the orifices of the feed tray and the size of the droplets is controlled by the level of liquid composition maintained in the feed tray. As a result, the delivery of the liquid composition to the feed tray should be tightly monitored and controlled.

In addition to the desire to closely control operation parameters of the cryogenic processor, other improvements are desired. For example, it is often desired to manufacture beaded ice-cream of various flavors. Often, unique flavors are created by mixing certain fundamental or base flavors. One way this may be accomplished is by manufacturing a first base flavor, then manufacturing a second base flavor, then mixing the two beaded ice-cream products. This approach, however, requires that piping and other machinery be cleaned between "batches" (i e., flavor changes). Another disadvantage of this approach is the added step of mixing the beaded form of the two base flavors.

Another way that a multi-flavor product may be created is by mixing the liquid form of the base flavors in appropriate proportions, before delivery to the feed tray. This approach, however, also requires that piping and other machinery be cleaned between batches.

Accordingly, it is desired to provide an improved cryogenic processor for preparing a unique, beaded ice-cream product.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a cryogenic processor for liquid feed preparation of a free-flowing frozen product comprising. In accordance with one aspect of the invention, the cryogenic processor includes a freezing chamber having a substantially conical shape, at least one feed tray overlying the freezing chamber arranged and adapted to receive liquid composition from a delivery source, the tray having a plurality of orifices for the discharge of uniformly sized droplets of the composition from the feed tray, whereby the droplets are delivered by gravity into the freezing chamber there-below. The cryogenic processor also includes at least one sensor associated with the feed tray for determining a depth of liquid composition in the feed tray, at least one valve associated with a liquid composition delivery line, the valve being configured to control the rate at which liquid composition is delivered from the delivery source to the feed tray, and a controller responsive to the at least one sensor for controlling a position of the valve, and therefore the rate at which liquid composition is delivered from the delivery source to the feed tray.

In accordance with another aspect of the invention, a method is provided for feeding liquid composition to a freezing chamber containing a refrigerant to form beads of frozen product. In accordance with this aspect of the invention, the method monitoring a level of liquid composition in each section of a multi-partition feed tray, closely controlling the delivery a liquid feed composition from a source to each section of the feed tray, discharging the liquid feed composition from each section of the feed tray through orifices in the form of droplets, via gravity, into a freezing chamber disposed below the orifices, monitoring a level of liquid refrigerant in a freezing chamber, and closely controlling the delivery of liquid refrigerant to the freezing chamber, in response to the step of monitoring the level of liquid refrigerant.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
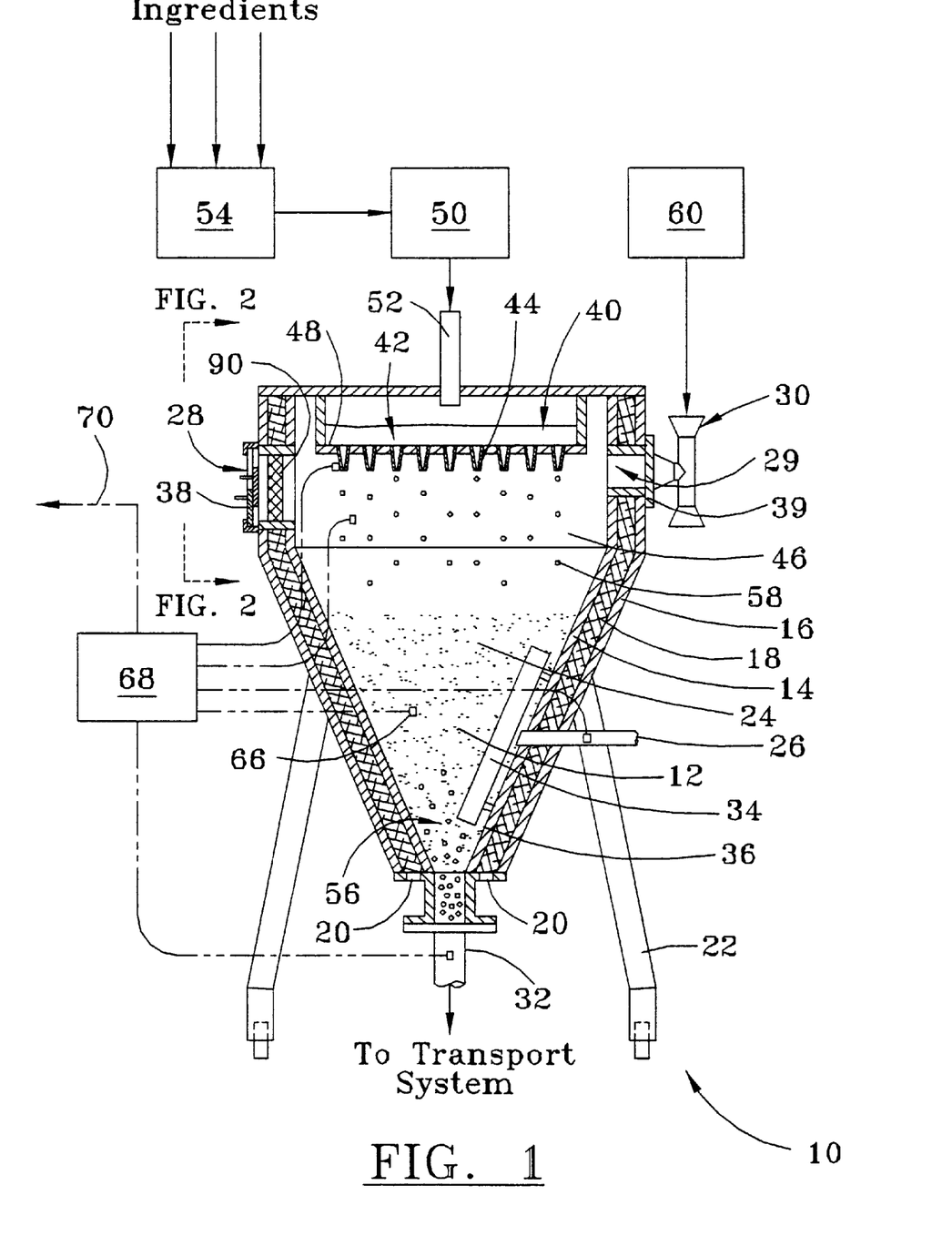
FIG. 1 is a cross-sectional elevation of the improved cryogenic processor.

Reference is now made to FIG. 1 showing an improved cryogenic processor constructed in accordance with the preferred embodiment of the present invention to produce free-flowing frozen product in the form of small beads. The fundamental method utilized to produce the product is described in detail in U.S. Pat. No. 5,126,156, and will be summarized below in order to facilitate an understanding of this unique production process. The apparatus as depicted in FIG. 1 enhances the efficiency of the prior art production process and increases product yield as described below.

Cryogenic processor 10 includes a freezing chamber 12 that is most preferably in the form of a conical tank that holds a liquid refrigerant therein. Freezing chamber 12 incorporates an inner shell 14 and an outer shell 16. Insulation 18 is disposed between the inner shell 14 and outer shell 16 in order to increase the thermal efficiency of the chamber 12. The freezing chamber 12, as shown in FIG. 1, is a free-standing unit supported by legs 22. Alternatively, the freezing chamber 12 may be disposed in a frame that is specially built to support the processor 10 while in use.

Refrigerant 24, preferably liquid nitrogen in view of its known freezing capabilities, enters the freezing chamber 12 by means of refrigerant inlet 26. Refrigerant 24 entering chamber 12 through inlet 26 is used to maintain a predetermined level of liquid refrigerant in the freezing chamber and must be added to replace refrigerant 24 that is lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen beads occurs through product outlet 32 adapted at the base of the freezing chamber 12.

When incoming refrigerant 24 enters the freezing chamber 12 through inlet 26, a swirling or cyclonic motion of refrigerant 24 may form in the freezing chamber 12 depending on the amount of refrigerant 24 allowed to enter through inlet 26 and the flow velocity of the incoming refrigerant 24. This cyclonic motion is not favorable to the production process because the frozen beads awaiting extraction at the bottom of freezing chamber 12 may be swept into the swirling refrigerant and thus prevented them from falling to the bottom of the freezing chamber for collection. A non-uniform beaded product can also be produced in this turbulent environment. This unwanted cyclonic motion of the incoming refrigerant is prevented by baffles 34 mounted to interior surface 36 of inner shell 14. Baffles 34 extend inwardly from interior surface 36 in the vicinity of the refrigerant inlet 26. Additionally, the baffles 34 are oriented so that their lengths are substantially vertical within the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

A feed tray 48 receives liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

It is recognized that in order to create uniformly sized beads 56 of frozen product, uniformly sized droplets 58 of liquid composition are required to be fed through gas diffusion chamber 46 to freezing chamber 12. The feed tray 48 is designed with feed assembly 40 that forms droplets 58 of the desired character. The frozen product takes the form of beads that are formed when the droplets 58 of liquid composition contact the refrigerant vapor in the gas diffusion chamber 46, and subsequently the liquid refrigerant 24 in the freezing chamber 12. After the beads 56 are formed, they fall to the bottom of chamber 12. A transport system connects to the bottom of chamber 12 at outlet 32 to carry the beads 56 to a packaging and distribution network for later delivery and consumption.

In accordance with one aspect of the invention, the preferred embodiment is designed with an incorporated vacuum assembly 30 which can take the form of a venturi. The vacuum assembly 30 cooperates with air inlet 28 and adjustment doors 38 so that an ambient air-flow passes through the inlet 28 and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. Air source 60, typically in the form of an air compressor, is attached to vacuum assembly 30 to provide appropriate suction to create the ambient air flow required.

Figure 2:
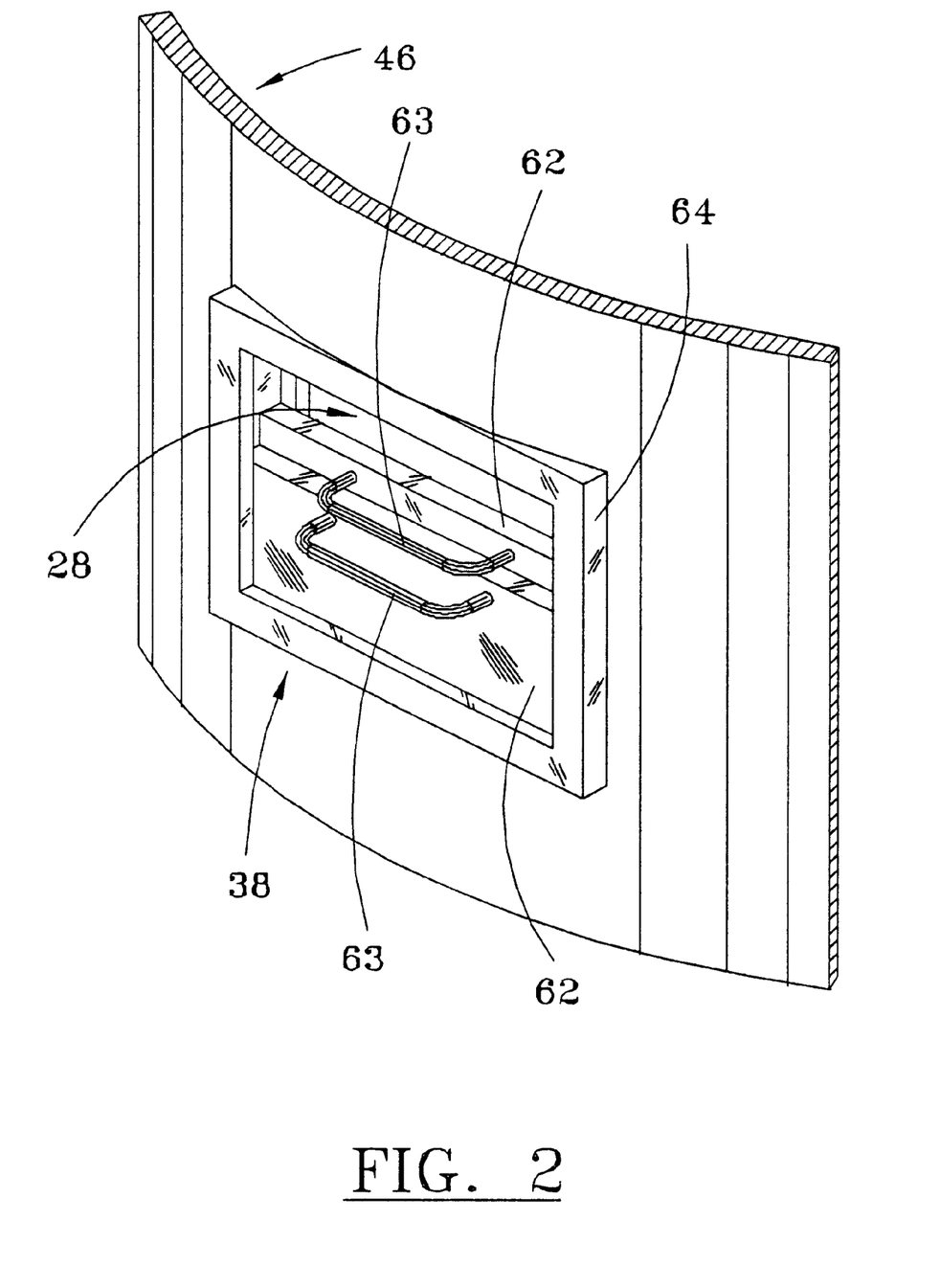
FIG. 2 is a cut-away perspective view of the adjustable air inlet doors.

As mentioned above, air inlet 28 incorporates adjustment doors 38 for controlling the amount of incoming ambient air. As shown in FIG. 2, the preferred embodiment of the doors 38 is a series of slidable door segments 62 mounted within a frame 64. This configuration accommodates numerous adjustment combinations so that the desired flow rates may be achieved between a full open setting where the doors 38 expose a maximum size inlet opening and a full closed setting where the doors completely block the inlet 28, thereby preventing ambient air flow. It should be recognized by those of ordinary skill in the art that numerous other embodiments of the inlet doors 38 may be used for achieving the desired results, i.e. a variable flow nozzle, or an adjustable inlet vent, to mention but a few.

Figure 3:
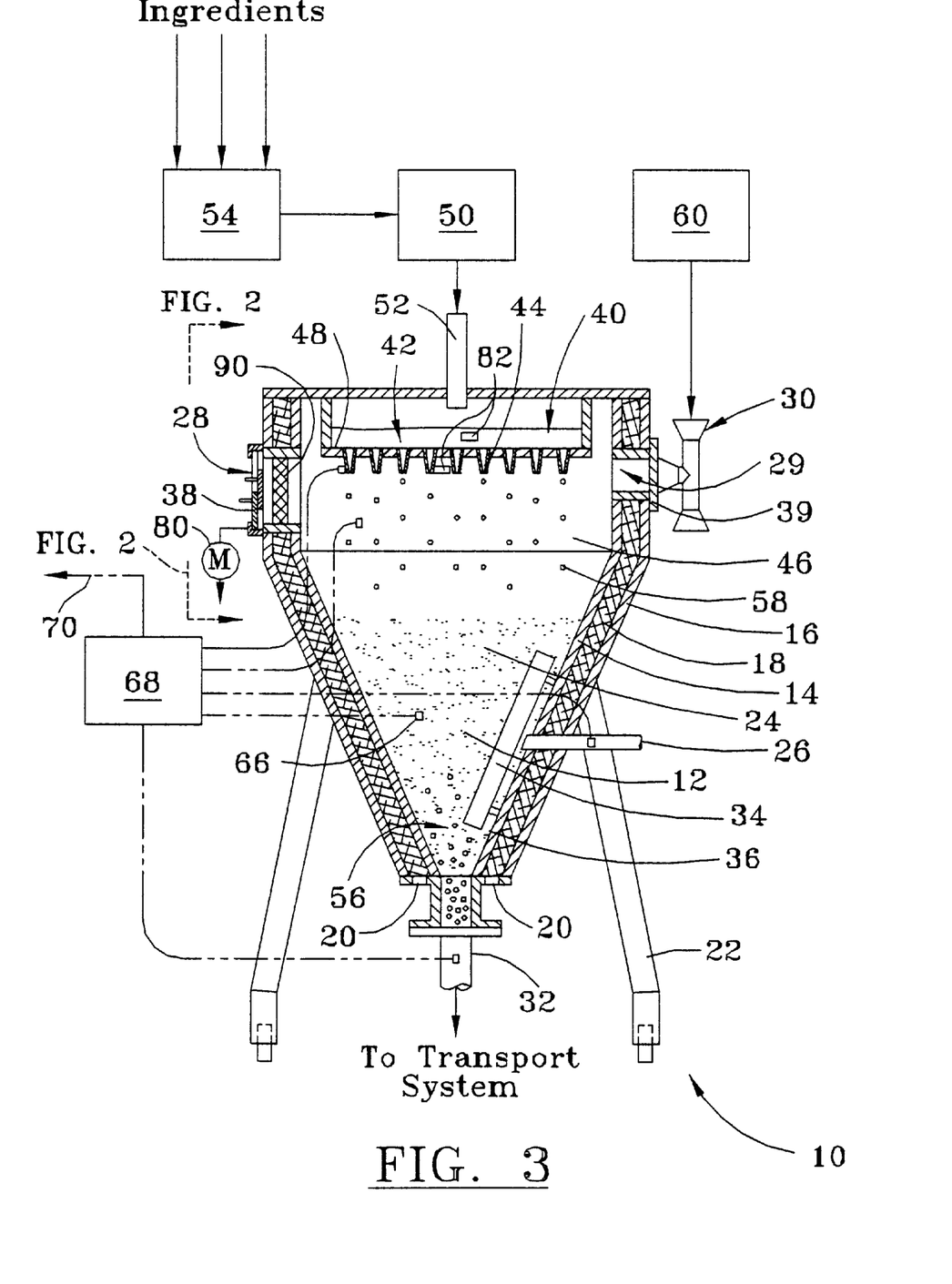
FIG. 3 is a cross-sectional elevation of an improved cryogenic processor, similar to FIG. 1, but further illustrating motorized control of air inlet doors.

In one embodiment, the doors 62 are manually adjusted. An operator outside the processor 10 may adjust the position of the doors 62 based upon observations, experience, or other factors. In another embodiment, the doors 62 may be automatically adjusted by a motor 80 (see FIG. 3), or other mechanism capable of moving the doors. In such an embodiment, temperature sensors 82 (or other appropriate sensors) may be utilized to sense the temperature surrounding the feed assembly 40. As the temperature falls below a predetermined temperature the motor 80 could adjust the doors 62 to increase the size of the inlet 28. Conversely, as the temperature rises above a predetermined temperature, the motor 80 could adjust the doors 62 to decrease the size of the inlet 28.

In yet another embodiment, the inlet 28 may be held constant and the vacuum source 60 may be adjusted to control the temperature surrounding the feed assembly 40. In such an embodiment, as the temperature 60 falls below a predetermined level, the vacuum source 60 may be controlled to increase the air flow across the droppers 44. Conversely, as the temperature rises above a predetermine temperature, the vacuum source 60 may be controlled to decrease the air flow across the droppers 44.

Further still, the temperature surrounding the feed assembly 40 may be controlled through a controlled combination of the inlet 28 size and the rate of air flow across the droppers 44. That is, temperature control may be implemented through a combination of motor 80 control and vacuum source 60 control.

In yet another embodiment, the motor 80 control and/or the vacuum source 60 control may be based upon the rate of flow liquid composition into the feed assembly. Liquid level sensors may be utilized to sense the level of liquid composition within the feed assembly. Under normal operation (with all droppers 44 completely open), a certain flow rate (of liquid composition into the feed assembly) will be established. If this rate decreases, such a decrease may be presumed to result from a formation of ice within the droppers 44. As a result, the motor 80 may be controlled to increase the size of inlet 28 and/or the vacuum source 60 may be controlled to increase the flow of air across the droppers 44.

Several sensors 66 may be incorporated to measure numerous operating values, such as freezing chamber temperature, refrigerant level, etc. These sensors each provide an input signal to control device 68 which monitors the production process and provides control output signals 70 to facilitate automatic production of the frozen beads. For purposes of illustration, these sensors have been included in FIG. 1 simply as dots. It will be appreciated, however, that the actual structure of the sensors will vary in accordance with the actual implementation.

Numerous benefits result from the use of the above-described system. In contrast to prior art designs where the freezing of liquid composition in the feed assembly created the need to discontinue the production process while the feed assembly was warmed and subsequently cleaned, the above-described system prevents the liquid from freezing in the feed assembly. Thus, the production process may continue uninterrupted.

Additionally, improperly frozen liquid composition represents waste, which must be screened and removed from the uniform beaded product prior to packaging. This waste and the processes associated with removing the waste from the desired product, e.g. operation of separation devices, decreases production efficiency. The present invention eliminates this waste. By use of the novel gas diffusion chamber and vacuum assembly, the need for a separation requirement is successfully eliminated, thus the prior art screening components and the power utilized to operate them are no longer required.

In accordance with one embodiment of the system, an air intake filter 90 (see FIGS. 1 and 3) may be disposed at the air inlet 28. Although illustrated on the inside of the doors 62, the intake filter 90 may alternatively be positioned on the outside of the doors 62. Although significant measures are taken to ensure that the environment surrounding the processor 10 is maintained in an extremely sanitary fashion, it has been recognized that certain airborne contaminants may nevertheless be present. As a result, the air intake filter 90 is provided to further sanitize and screen the air that is allowed to flow across the feed assembly 40, thereby resulting in a more pure and clean frozen product.

Consistent with the scope and spirit of the present invention, the material used to form the filter 90, the filter density, porosity, and other characteristics may be varied. Indeed, the invention is not limited to any of these particulars of the intake filter 90. Notwithstanding, a filter constructed in accordance with a preferred embodiment of the invention will remove all contaminants 0.2 microns in size or larger.

In accordance with yet another aspect of the present invention, the thermal characteristics of the processor 10 are improved. Preferably, the processor 10 is constructed with a double-wall construction, having an inner wall 14 and an outer wall 16. Previous generation processors have included foam glass insulation between the walls 14 and 16. However, in accordance with one aspect of the invention, a vacuum jacket is instituted to insulate the liquid refrigerant within the processor 10. Accordingly a port (not shown) and vacuum source (not shown) may be provided to evacuate the chamber between the inner wall 14 and outer wall 16. It has been found that such a "vacuum jacket" provides better insulating quality than a foam glass jacket. As a result, the rate at which the liquid refrigerant vaporizes and evaporates is reduced. Thus, a smaller amount of liquid refrigerant is required for the preparation of a given amount of frozen product.

IMPROVEMENT OF THE PRESENT INVENTION

Figure 4:
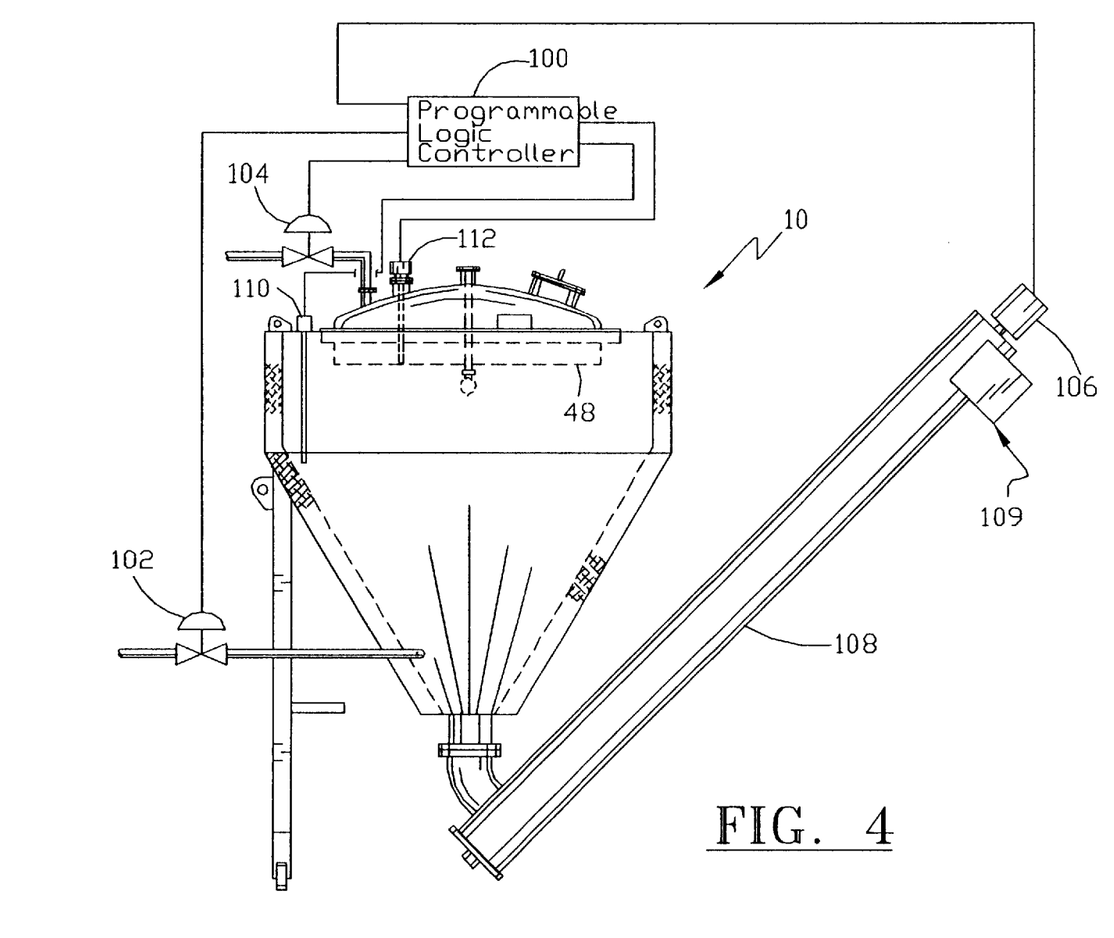
FIG. 4 is a diagram of the improved cryogenic processor illustrating various control sensors and valves.

Having described a cryogenic processor 10 to better define the environment of the present invention, the improvement of the present invention relates to a control system for controlling the operation of the cryogenic processor described above. In this regard, reference is made to FIG. 4 and the appendix attached hereto. FIG. 4 is a diagram of the cryogenic processor 10 showing various control valves. For simplicity, some of the details of the cryogenic processor illustrated in FIGS. 1–3 have been eliminated from the diagram of FIG. 4. The operation of the control system is computer-controlled, and the flow-charts and logic for controller 100 are described in detail in the Appendix hereto.

Broadly, the controller 100 operates to control the operation of the various valves to regulate both the level of liquid nitrogen in the freezing chamber and the liquid composition that is delivered to the feed tray 48. In one embodiment, the feed tray 48 may be a single tray, for holding a single flavor of liquid composition. There is at least one throttling valve 102 for controlling the introduction of liquid nitrogen into the cryogenic processor 10. Likewise, there is a valve 104 for controlling the introduction of liquid composition into the feed tray 48. Both of these valves are controlled by one or more electrical signals output from the controller 100.

In the illustrated embodiment, the controller 100 also generates an output signal that controls a drive motor 106 for an auger delivery system 108. The auger delivery system 108 includes a screw conveyor that carries frozen beads of ice cream from the bottom of the cryogenic processor 10 upward to chute 109, where the beads are output for packaging. As illustrated, the mouth of the chute 109 is vertically above the surface level of the liquid nitrogen. Therefore, liquid nitrogen is separated from the beaded ice cream in the auger delivery system 108. Any trace amounts of liquid nitrogen that may be on the outer surface of the beaded ice cream evaporates therefrom before being expelled from the chute 109. In this regard, and as is known, liquid nitrogen has a very rapid evaporation rate.

The rate of drive motor 106 may be set to depend upon the rate of introduction of liquid composition into the feed tray 48.

In addition to the outputs described above for the controller 100, the controller 100 has several inputs. These include an input indicative of the level of liquid nitrogen in the reservoir of the cryogenic processor 10, and an input indicative of the level of liquid composition in the feed tray 48. The input indicative of the level of liquid nitrogen may be provided through pressure transducer 110, or in other manners that are well known for sensing liquid levels. Preferably, the surface level of the liquid nitrogen is maintained to be approximately 18–22 inches from the bottom of the feed tray 48. As the level approaches a distance of approximately 22 inches, the valve 102 may be controlled to allow the introduction of liquid nitrogen into the reservoir at a greater rate. Likewise, as the level approaches a distance of approximately 18 inches, the valve 102 may be controlled to slow the rate of the introduction of liquid nitrogen into the reservoir. It is preferred to maintain the introduction of liquid nitrogen into the reservoir at a relatively constant rate, to prevent over-agitation of the liquid nitrogen within the reservoir. By minimizing the agitation of the liquid nitrogen, smoother and more-spherical beads of beaded ice cream are obtained.

The input indicative of the level of liquid composition in the feed tray 48 may be provided through a capacitance probe 112, or in other manners that are well known for sensing liquid levels. The higher the level of liquid composition within the feed tray, the greater the rate at which the liquid composition is expelled from the droppers 44 (see FIGS. 1–3) that depend from the feed tray 48. The actual height of the liquid level may depend upon the flavor of ice cream that is being made, as differing flavors may have differing viscosities, as well the size of the frozen bead that is desired.

Although not specifically illustrated, another input may be provided to the controller 100 in the form of a feedback measure from the auger delivery system 108. That is, a sensor may be configured to measure the actual rotational speed of the auger, and this sensed value may be fed back to the controller 100.

Figure 5:
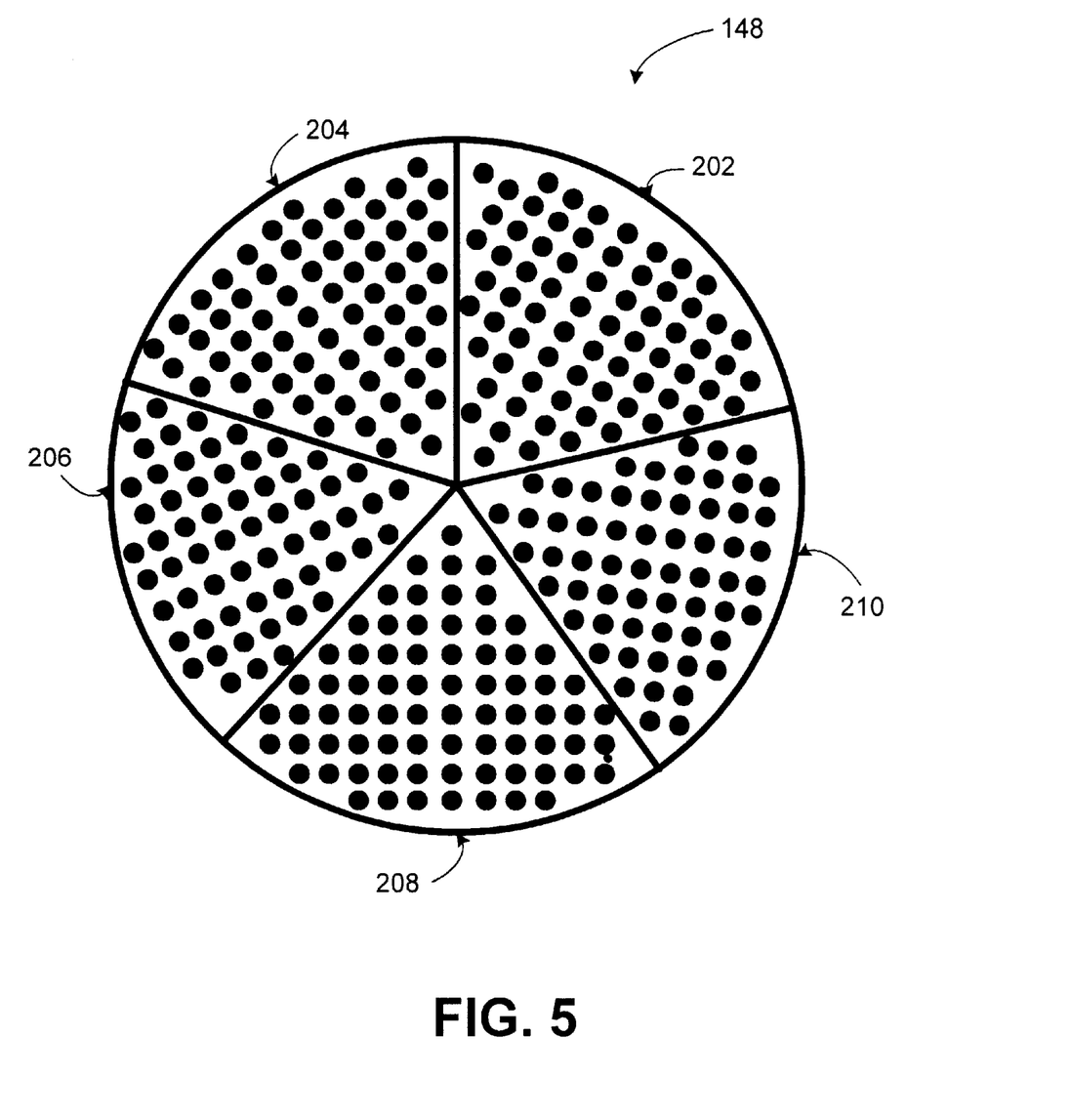
FIG. 5 is a top-view of a multi-partition feed tray used in one embodiment of the invention.

In other embodiments the feed tray (see FIG. 5) may be partitioned to hold several flavors of liquid composition, and the final product would be a mix of beaded ice-cream flavors. For example, FIG. 5 illustrates a feed tray 148 having five partitions 202, 204, 206, 208, and 210. Each separate partition may be dedicated to a specific flavor. Thus, for example, one partition 202 may be dedicated to vanilla, one partition 204 may be dedicated to chocolate, one partition 206 may be dedicated to strawberry, etc. Vanilla-flavored ice cream may be manufactured by controlling the appropriate delivery valves to deliver only vanilla liquid composition to its partition (i.e., shutting off the delivery of all other flavors). Likewise, chocolate-flavored ice cream may be manufactured by controlling the appropriate delivery valves to deliver only chocolate liquid composition to its partition. Flavored mixtures may be manufactured by controlling the respective delivery valves appropriately.

For example, in such an embodiment (not specifically shown) there may be several control valves for regulating the flow of liquid composition into the different partitions of the feed tray 148. It will be appreciated that each such control valve is separately controlled and regulated based upon the percentage of that particular flavor that is desired in the final beaded ice-cream composition. For example, to make an ice cream product having 75% vanilla and 25% chocolate beads, then the rate of the valve allowing the introduction of vanilla liquid composition into the feed tray 148 is controlled so that the vanilla is introduced into its partition 202 of the feed tray 148 at approximately 3 times the rate that the chocolate liquid composition is introduced into its partition 204 of the feed tray 148.

It will be appreciated that such a multiple partitioned feed tray 148 allows the manufacture of differing flavors of beaded product in successive runs of the cryogenic processor 10, without having to cleaning the equipment between successive runs.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A cryogenic processor for liquid feed preparation of a free-flowing frozen product comprising:
   a freezing chamber having a substantially conical shape;
   at least one feed tray overlying the freezing chamber arranged and adapted to receive liquid composition from a delivery source, the tray having a plurality of orifices for the discharge of uniformly sized droplets of the composition from the feed tray, whereby the droplets are delivered by gravity into the freezing chamber there-below;
   at least one sensor associated with the feed tray for determining a depth of liquid composition in the feed tray;
   at least one valve associated with a liquid composition delivery line, the valve being configured to control the rate at which liquid composition is delivered from the delivery source to the feed tray; and
   control means responsive to the at least one sensor for controlling a position of the valve, and therefore the rate at which liquid composition is delivered from the delivery source to the feed tray.

2. The cryogenic processor as defined in claim 1, wherein the feed tray includes partitions that define a plurality of separated compartments.

3. The cryogenic processor as defined in claim 2, wherein each of the plurality of compartments includes at least one sensor for determining the depth of liquid composition in the feed tray.

4. The cryogenic processor as defined in claim 3, wherein the at least one valve includes a plurality of valves, wherein at least one valve is associated with a composition delivery line and is configured to control the rate at which composition is delivered from the delivery source to each compartment of the feed tray.

5. The cryogenic processor as defined in claim 4, wherein the control means is responsive to each of the plurality of sensors, the control means controlling each of the plurality of valves to control the rate at which liquid composition is delivered from the delivery source to each of the plurality of compartments of the feed tray.

6. The cryogenic processor as defined in claim 1, further including an auger delivery system configured to deliver frozen product from a bottom of the freezing chamber to a delivery chute.

7. The cryogenic processor as defined in claim 6, wherein the control means further includes at least one output signal for controlling the rate at which the auger delivery system removes frozen product from the bottom of the freezing chamber.

8. The cryogenic processor as defined in claim 1, wherein the control means includes a programmable logic controller.

9. The cryogenic processor as defined in claim 1, wherein the plurality of orifices is further defined as having an associated plurality of feed droppers for producing droplets from the liquid composition.

10. The cryogenic processor as defined in claim 1, further including at least one nitrogen level sensor configured to determine a level of liquid nitrogen in the freezing chamber.

11. The cryogenic processor as defined in claim 10, further including a nitrogen delivery valve associated with a liquid nitrogen supply line, the nitrogen delivery valve for controlling the rate at which liquid nitrogen is delivered to the freezing chamber.

12. The cryogenic processor as defined in claim 11, wherein the control means is responsive to the at least one nitrogen level sensor for controlling a position of the nitrogen delivery valve and thereby controlling the rate at which liquid nitrogen is delivered to the freezing chamber.

13. The cryogenic processor as defined in claim 1, in which the freezing chamber is further defined as having an interior surface and a means for baffling fluid flow, the means for baffling arranged and attached to the interior surface of the freezing chamber such that incoming liquid refrigerant is prevented from creating a disruptive cyclonic flow within the freezing chamber.

14. The cryogenic processor as defined in claim 1, in which the freezing chamber is further defined by an inner shell and an outer wall, and thermal insulation disposed between the inner wall and the outer wall.

15. The cryogenic processor as defined in claim 14, wherein the thermal insulation is an evacuated space between the outer wall and the inner wall.

16. A system for controlling the operation of a cryogenic processor for liquid feed preparation of a free-flowing frozen product comprising:
    at least one sensor associated with a feed tray of the cryogenic processor for determining a depth of liquid composition in the feed tray;
    at least one valve associated with a liquid composition delivery line, the valve being configured to control the rate at which liquid composition is delivered from a delivery source to the feed tray; and
    control means responsive to the at least one sensor for controlling a position of the valve, and therefore the rate at which liquid composition is delivered from the delivery source to the feed tray.

17. The cryogenic processor as defined in claim 16, further including an auger delivery system configured to delivery frozen product from a bottom of a freezing chamber to a delivery chute.

18. The cryogenic processor as defined in claim 17, wherein the control means further includes at least one output signal for controlling the rate at which the auger delivery system removes frozen product from the bottom of the freezing chamber.

19. The cryogenic processor as defined in claim 16, wherein the control means includes a programmable logic controller.

20. The cryogenic processor as defined in claim 16, further including at least one nitrogen level sensor configured to determine a level of liquid nitrogen in a freezing chamber.

21. The cryogenic processor as defined in claim 20, further including a nitrogen delivery valve associated with a liquid nitrogen supply line, the nitrogen delivery valve for controlling the rate at which liquid nitrogen is delivered to the freezing chamber.

22. The cryogenic processor as defined in claim 21, wherein the control means is responsive to the at least one nitrogen level sensor for controlling a position of the nitrogen delivery valve and thereby controlling the rate at which liquid nitrogen is delivered to the freezing chamber.

23. A cryogenic processor for liquid feed preparation of a free-flowing frozen product comprising:

a freezing chamber having a substantially conical shape;

a plurality of feed trays overlying the freezing chamber arranged and adapted to receive liquid composition from a plurality of delivery sources, each tray having a plurality of orifices for the discharge of uniformly sized droplets of the composition from the trays, whereby the droplets are delivered by gravity into the freezing chamber there-below;

a sensor associated with each feed tray for determining a depth of liquid composition in each feed tray;

a valve associated with each of a plurality of liquid composition delivery lines, wherein a distinct delivery line is configured to deliver liquid composition from each delivery source to each feed tray, each valve being configured to control the rate at which liquid composition is delivered from each delivery source to each feed tray; and control means responsive to each sensor for controlling a position of each valve, and therefore the rate at which liquid composition is delivered from each delivery source to each feed tray.

24. A method of feeding liquid composition to a freezing chamber containing a refrigerant to form beads of frozen product, comprising the steps of:

monitoring a level of liquid composition in each section of a multi-partition feed tray;

closely controlling the delivery a liquid feed composition from a source to each section of the feed tray;

discharging the liquid feed composition from each section of the feed tray through orifices in the form of droplets, via gravity, into a freezing chamber disposed below the orifices;

monitoring a level of liquid refrigerant in a freezing chamber; and closely controlling the delivery of liquid refrigerant to the freezing chamber, in response to the step of monitoring the level of liquid refrigerant.

\* \* \* \* \*